Nov. 27, 1934.  C. H. BRASELTON  1,981,985
AUTOMOBILE LIGHTING SYSTEM
Filed April 29, 1930    2 Sheets-Sheet 1

Patented Nov. 27, 1934

1,981,985

UNITED STATES PATENT OFFICE 1,981,985

AUTOMOBILE LIGHTING SYSTEM

Chester H. Braselton, New York, N. Y.

Application April 29, 1930, Serial No. 448,374

5 Claims. (Cl. 171—97)

This invention relates to automobile lighting systems and particularly to a system for automatically turning on the lights of a vehicle when darkness falls.

In the daily use of an automobile it is often advantageous to park the automobile during the hours of daylight allowing it to remain until after dark. In order to do this it is necessary either to turn the lights on before leaving the car or to make a special trip back to the car in the early evening in order to turn the lights on. If neither of these precautions is taken the owner of the car opens himself not only to the danger of collision from other cars, the drivers of which may not see his car in the dark, but in most instances to the danger of breaking a city ordinance which requires lights on vehicles after sundown.

It is, therefore, one of the objects of the present invention to provide an apparatus which will automatically turn on the lights of an automobile as soon as it becomes dark.

Another object of the invention is to provide an apparatus for an automobile which will not only automatically turn the lights on when it becomes dark but which will automatically turn them off when it becomes light.

Another object of the invention is to provide an automatic lighting device for a vehicle driven by an internal combustion engine which will be rendered inoperative by the turning on of the engine ignition switch and which may only be operated when the ignition switch is turned off.

Other objects of the invention will be apparent as the description thereof proceeds.

The invention has been illustrated in the accompanying drawings in which.

Figure 1:
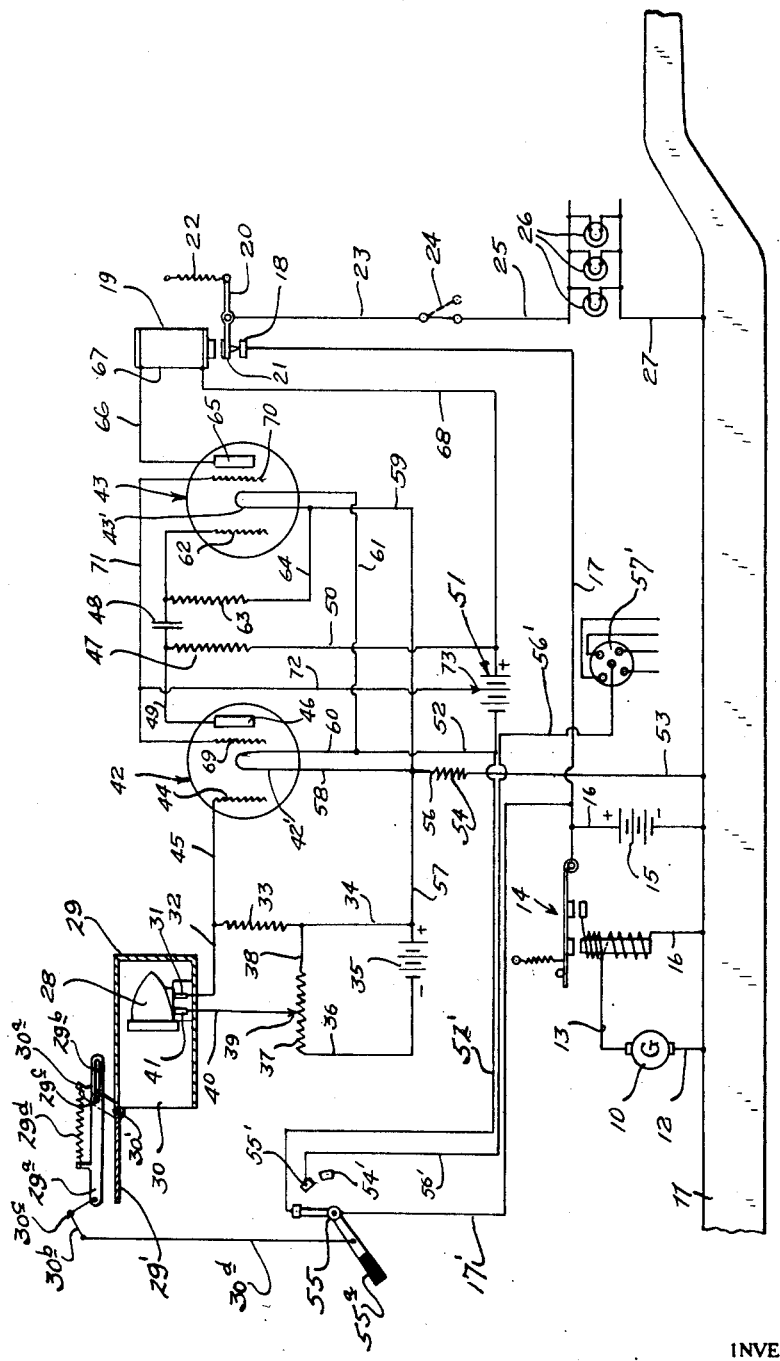
Fig. 1 is a diagrammatical illustration of one embodiment thereof.
Figure 2:
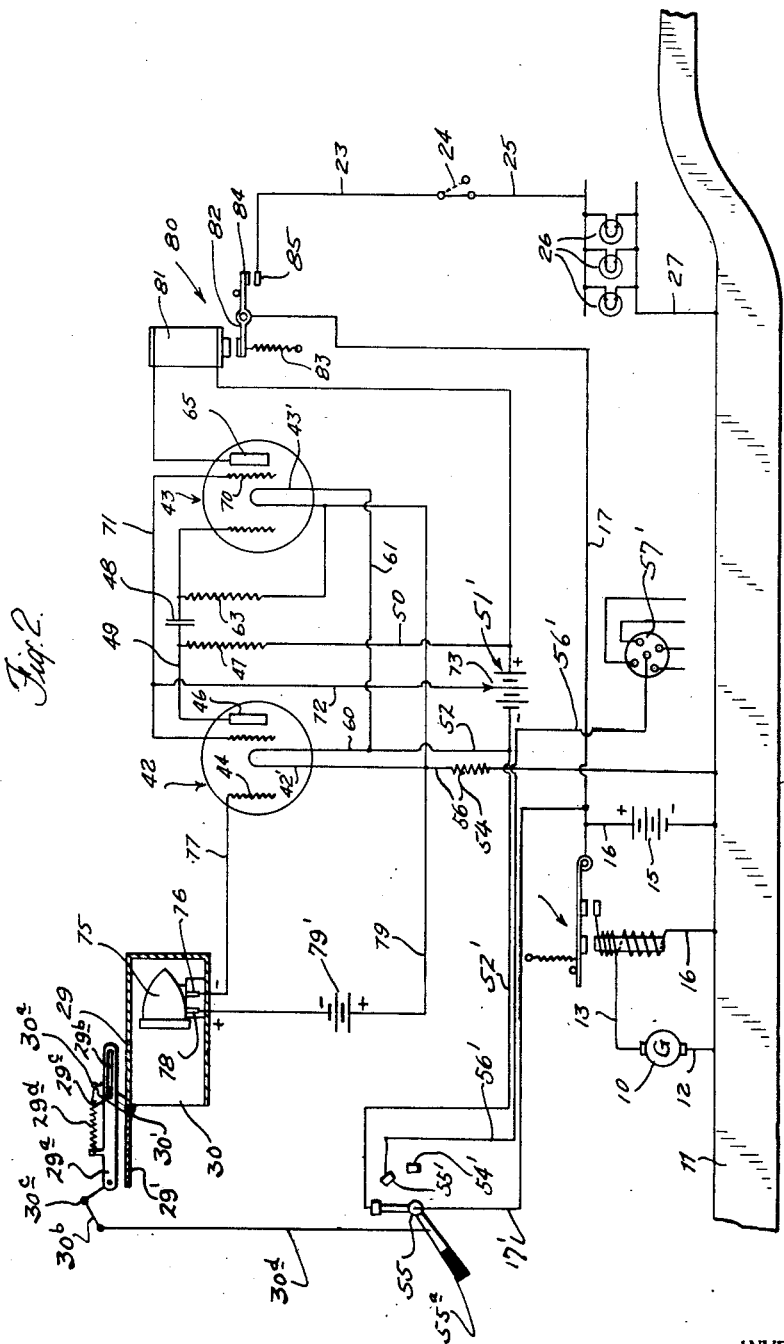
Fig. 2 is a diagrammatical illustration of another embodiment thereof.

In Fig. 1 a generator 10 is shown having one side connected to the frame 11 of a vehicle by means of the wire 12 while the other side is connected by means of a wire 13 to an automatic cut-out switch or relay 14. The wire 13 is attached to one end of the principal energizing coil 15 of the relay 14, the other end of which is attached by means of the wire 16 to the frame 11. The relay 14 has an armature which is adapted to be moved when the magnet is energized and forms the regular automatic cut-out switch which is connected to the battery 15 and closes the circuit between the generator 10 and the battery only when the generator is producing a predetermined minimum voltage. The positive side of the battery is connected to a wire 17 which is connected to the relay 14 while the negative side is grounded on the frame 11 as indicated.

This construction just described is found on practically all automobiles now in use and, of course, any apparatus such as the spark plugs, horn, and certain of the headlights may be operated from the battery in the usual way.

The wire 17 which is connected at one end to the positive side of the battery and the relay 14, is connected at its other end to a fixed contact 18 of a relay 19. The relay 19 has a movable armature 20 having a contact 21 which is normally touching the contact 18, urged by the spring 22. The armature 20 is connected by means of a wire 23 to a switch 24, the other end of the switch being connected by a wire 25 to one side of the parking lights 26, the other side of these lights being connected by means of a wire 27 to the frame 11. When the contacts 18 and 21 are in engagement and the switch 24 is closed it will be evident that the lights 26 will receive current from the battery 15 and will be energized.

In order to effect the automatic turning on and off of the lights 26 I provide a light-sensitive cell 28 similar to the one described in the reissue patent of Samuel Ruben, entitled "Light sensitive device" Reissue No. 19,218, dated June 19th, 1934, which is positioned on some part of the automobile where it can receive diffused daylight. In order to prevent this cell from operating by lights of passing vehicles or other artificial lights in the vicinity of the automobile I provide a casing 29 which surrounds the cell and is open at one end 30 to permit diffused light to enter. This casing and light-sensitive cell may be positioned under the instrument board if desired, and an opening may be provided in the side of the car through which the light may enter.

One terminal 31 of the light-sensitive cell may be connected by means of a wire 32 to a resistance 33, the other end of which is connected by means of a wire 34 to the positive side of a small battery 35. The negative side of the battery 35 may be connected by means of the wire 36 to one side of a potentiometer 37, the other side of which may be connected by means of the wire 38 to the wire 34 which is connected to the positive side of the battery 35. The arm 39 of the potentiometer may be connected by means of a wire 40 to the other terminal 41 of the light-sensitive cell 28.

With this arrangement the arm of the potentiometer 39 may be set so that the potential impressed by the battery across the terminals 31 and 41 of the light-sensitive cell 28 may be made to balance the dark potential of the cell so that when the cell is in darkness no current flows therethrough. However, when any light enters the cell a potential is set up therein which causes current to flow through the resistance 33.

In order to amplify any variation of the light-sensitive cell 28 I provide two shield grid tubes 42 and 43 connected together in cascade. The grid 44 of the tube 42 is connected by means of a wire 45 to the wire 32 or, in other words, to the terminal 31 of the light-sensitive cell. The anode 46 of the tube 42 is connected to one end of a resistance 47 and to one side of the condenser 48 by means of the wire 49, the other end of the resistance being connected by means of the wire 50 to the positive side of a B battery 51. The other side of the B battery 51 is connected to a wire 52 which forms the positive filament lead of the vacuum tubes 42 and 43 and is connected to the wire 17 through the switch 55 by means of leads 52' and 17' and therefore, to the positive side of the automobile storage battery 15. A wire 53 is connected to the frame 11 and to a resistance 54 the other side of which is connected by means of a wire 56 to a wire 57 which is connected to the positive side of the battery 35. Wires 58 and 59, both connected to the wire 56, are connected respectively to the negative filament terminals of the vacuum tubes 42 and 43, while wires 60 and 61, both connected to the wire 52, are connected respectively to the positive filament terminals of the vacuum tubes 42 and 43. Thus connected the tube filaments are in parallel and are energized from the battery 15 when the switch 55 is closed, the resistance 54 being used to maintain the proper voltage supplied to the vacuum tubes.

The casing 29 which holds the light-sensitive cell 28 may be provided with a movable shutter 29' which is pivoted at 30' and when closed prevents any light from striking the light-sensitive cell. Any suitable means for opening and closing the shutter when the switch is moved may be employed. As illustrated an arm 30a is attached to the shutter 29' and is connected by means of a link 29a to a bell crank 30b which is pivoted at 30c. The other side of the bell crank is connected by means of a link 30d to the arm 55a of the switch 55 so that when the switch 55 is rotated the shutter 29' will open and close.

The switch 55 may be a three-way switch as indicated having a contact 55' which may be connected by means of a wire 56' to a distributor 57' from which the wires to the induction coils and spark plugs (not shown) are led. When the ignition is turned on as by moving the switch to the terminal 55', the vacuum tubes 42 and 43 are de-energized and the shutter 29' for the light-sensitive cell is closed so that the automatic lighting apparatus will not operate when the engine is running. The third contact 54' of the switch 55 may have nothing connected to it so that it is the "off" position of the switch when neither the ignition nor the vacuum tubes are turned on.

In order to provide for no movement of the shutter 29' when the switch 55 is turned to the off position I provide a lost-motion device in the link 29a. A slot 29d is provided in the end of the link 29a and the pivot 29c attached to the arm 30a is positioned in this slot. A spring 29b urges the arm 30a toward one end of the slot as indicated so that when the switch 55 is moved to the contact 54' the link 29a may still move away from the arm 30a against the tension of the spring 29b, the pivot 29c merely moving in the slot 29d.

The other side of the condenser 48 is connected to the grid 62 of the vacuum tube 43 and to one end of a grid leak 63, the other side of which is connected by means of the wire 64 to the negative filament terminal of the vacuum tube 43. The anode 65 of the vacuum tube 43 may be connected by means of a wire 66 to one side of the magnet coil 67 of a relay 19. The other side of this magnet coil may be connected by means of the wire 68 to the positive side of the B battery 51.

I prefer to use shield grid tubes so as to get a greater amplification and as shown the shield grid 69 of the tube 42 is connected to the shield grid 70 of the tube 43 by means of the wire 71 and both are connected by means of the wire 72 to a positive potential as at 73 on the battery 51.

The operation of the device is as follows: Assuming that it is broad daylight and it is desired to park the automobile on a street where lights are necessary after dark and that the engine is running, the switch 24 may first be closed. Inasmuch as the contacts 18 and 21 are touching as urged by the spring 22, a circuit is closed through the parking lights 26, which are then lighted, drawing current from the battery 15. The switch 55 is then turned to the position indicated in full lines which turns off the ignition, thus stopping the engine, opens the shutter 29', and closes the vacuum tube circuit which energizes the two vacuum tubes 42 and 43. Inasmuch as it is daylight, a potential will be set up between the terminals 41 and 31 of the light-sensitive cell 28 and current will flow through the resistance 33 which will cause a difference in potential between the grid 44 and the filament 42' of the vacuum tube 42. I prefer to use a light-sensitive cell in which the terminal 31 becomes positive and the light-sensitive terminal 41 negative under the influence of light, as described in the application above referred to, and if such a cell is used, the grid 44 of the vacuum tube 42 will be charged positively due to the influence of light and the electron stream flowing from the cathode 42' to the anode 46 will be increased. The anode current flowing through the resistance 47 will cause a positive potential to be built up on the grid 62 of the vacuum tube 43 thus causing an increased flow of electrons from the filament 43' to the anode 65 and increasing the current in the anode circuit of the tube 43, which includes the relay 19, energizing the magnet coil 67 and causing the armature 20 to move toward the magnet thereby separating the contacts 18 and 21.

It is thus evident that with the cell 75 it is possible to do away with the battery 35 and potentiometer 37 as well as the resistance 33. As the dark current flow in the cell 75 is practically zero and the terminal 76 becomes negative when light affects the cell it will be evident that the grid 44 of the first tube 42 cannot ever become positive and therefore, there will be little current flowing through the cell 75 which might cause it to deteriorate. If desired a "C" battery 79' may be provided to eliminate any current flowing in the grid circuit.

With the use of such a cell the grids of the tube are rendered more negative as the light is increased and hence there is a falling off of the anode current with increase of light so that a different relay arrangement must be provided in the output circuit of the last tube. Thus the relay 80 has a magnet coil 81 connected in the plate circuit of the tube 43 exactly the same as the magnet 67 in Fig. 1. The armature 82, however, is pivotally mounted and urged away from the magnet 81 by means of the spring 83 and the contacts 84 and 85 are so arranged that they are opened when the magnet is de-energized as the spring 83 draws the armature away from it, and closed when the magnet 81 is energized. The contacts 84 and 85 take the place of the contacts 18 and 21 of Fig. 1. They are connected respectively to the wires 17 and 23 which are connected to the battery and to the light as shown in Fig. 1. In this modification, therefore, it will be seen that the relay 80 releases due to the effect of light upon the light-sensitive cell 75 which thereupon opens the contacts 84 and 85, and is energized when light no longer affects the cell 75, thereby closing the contacts 84 and 85 and turning on the light.

It will thus be seen from the above description that the device of either figure will automatically light the lights on an automobile when it becomes dark and also automatically turn the lights out when it becomes daylight again. Also it will be evident that the ignition switch is so arranged that the automatic lighting device cannot be operated when the ignition is turned on so that there will be no possibility of operating the vacuum tubes while the car is running.

When the light-sensitive cell is not in use it will be noted that it is maintained in total darkness by the shutter 29' closing the opening 30 and the casing 29 and the cell is thus protected from any deterioration due to the intensity of light so that the life of the cell is prolonged. The shutter also protects the cell from any dust which might accumulate on the window thereof and insures a clear reception of light when the shutter is opened.

While I have described the invention in connection with an amplifier using two shield grid tubes it will be evident that in some instances the light-sensitive cell may be made to operate directly on a sensitive relay or more vacuum tubes may be used to amplify the action of the light-sensitive cell, depending on the type of cell used and the type of relay.

While I have described the invention in connection with an automobile it will also be evident that it may be used with any type of vehicle including railroad trains, buses, ships, aeroplanes, and dirigible balloons.

Many modifications of the invention may be resorted to without departing from the spirit thereof and I do not, therefore, desire to limit myself to the specific embodiment shown and described except as such limitations occur in the appended claims.

What I desire to secure by Letters Patent is:

1. In a vehicle lighting system a source of electrical energy, an electric light, a switch for controlling said light in the circuit between said light and source of energy, a light-sensitive cell, an amplifier connected to said light-sensitive cell and adapted to operate said switch, movable means to control the light falling on said light-sensitive cell, and means to simultaneously move said light controlling means and energize said amplifier.

2. In a vehicle lighting system a source of electrical energy, an electric light, a switch between said light and said source of energy, a light-sensitive cell, a shutter for said light-sensitive cell to control the amount of light to be received thereby, means between said light-sensitive cell and said switch to control the operation of said switch by the light falling on said light-sensitive cell, and means to simultaneously energize said last mentioned means and open said shutter.

3. In an automobile lighting system a source of electrical energy, an electric light, a switch connected between said light and source of energy, a light-sensitive cell, an amplifier connected to said light-sensitive cell, means controlled by said amplifier to operate said switch whereby said switch is controlled by the light falling upon said cell, a shutter for said light-sensitive cell, a multiple contact ignition switch having an ignition contact and switch contact, means to open said shutter when said ignition switch is turned to the other contact, and means to simultaneously energize said amplifier when said switch is so turned.

4. In a lighting system for a vehicle an electric light, a source of energy for said light, an electrical connection between said source and said light and including a switch, means to operate said switch, a light-sensitive cell, means connecting said light-sensitive cell with said switch operating means whereby said switch is controlled by the effect of light upon said light-sensitive cell, a relatively large housing open at one end surrounding said light-sensitive cell to protect said cell from direct light, a cover for the open end of said housing, a second switch to control the operation of said first mentioned means, and mechanical means for connecting said cover with said second switch whereby said cover is closed when said switch is opened.

5. In a lighting system for a vehicle adapted to be propelled by an internal combustion engine an electric light, a source of electrical energy, a connection between said light and said source and including a switch, magnetic means for operating said switch, a light-sensitive cell, an amplifying device between said cell and said magnetic means whereby said switch is controlled by the light affecting said light-sensitive cell, a double contact switch, one of said contacts being connected to the ignition system of said internal combustion engine and the other of said contacts being connected to said amplifying device whereby either said ignition system or said amplifying device may be energized, a housing for said light-sensitive cell having an opening at one end and being large enough to prevent direct rays from reaching said cell but permitting said cell to be affected by diffused light, a cover for the open end of said housing, and mechanical means controlled by said double contact switch for closing said cover to protect said cell against the effect of light when said double contact switch is moved to deenergize said amplifying device.

CHESTER H. BRASELTON.